Dec. 29, 1942.  W. H. FLOOD  2,306,692
FISHING LURE
Filed Aug. 4, 1941

Inventor

WARREN H. FLOOD

By *Clarence A. O'Brien*

Attorney

Patented Dec. 29, 1942

2,306,692

UNITED STATES PATENT OFFICE 2,306,692

FISHING LURE

Warren H. Flood, Gurnee, Ill.

Application August 4, 1941, Serial No. 405,400

1 Claim. (Cl. 43—47)

This invention relates to new and useful improvements in fishing lures.

The principal object of the present invention is to provide a fishing lure which can be used either in casting or trolling.

Another important object of the invention is to provide a lure of the character stated which is constructed in such a manner as to perform certain antics when being pulled in the water simulating the action of live bait.

Another important object of the invention is to provide a fishing lure which will perform a worm-like motion in the water when pulled to simulate a large angling earth worm.

Other objects and advantages of the invention will become apparent to the reader of the following specification.

Figure 1:
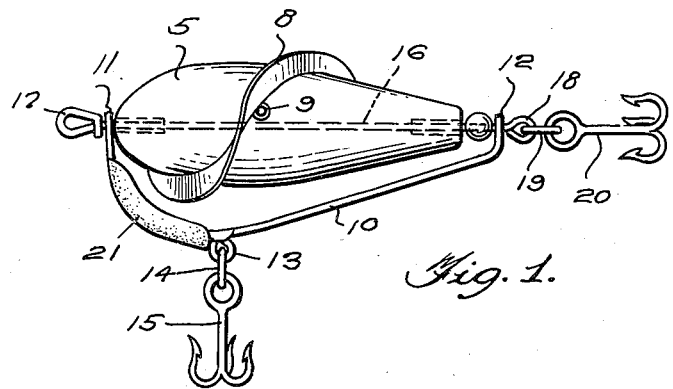
Figure 1 represents a side elevational view of the lure.
Figure 2:
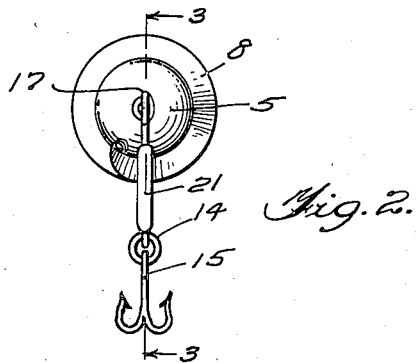
Figure 2 is an end elevational view of the lure.
Figure 3:
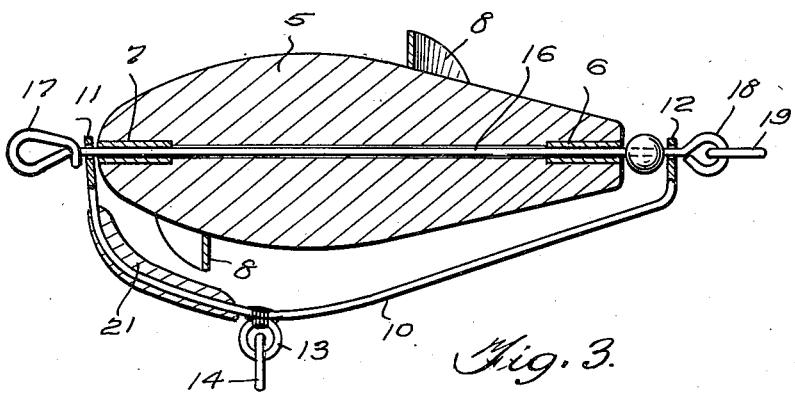
Figure 3 is a longitudinal sectional view taken substantially on the line 3—3 of Figure 2.

Referring to the drawing wherein like numerals designate like parts, it can be seen that numeral 5 denotes an elongated streamlined substantially tear drop-shaped body, constructed of a wood that has a substantial buoyant property.

The body 6 has a longitudinally extending bore opening at its end and in the end portions of the bore are set bearing sleeves 6, 7.

An elongated metallic spiral fin 8 extends longitudinally of the body 5 and this fin has ears to which securing elements 9 are disposed to secure the pin to the body. Numeral 10 denotes a stabilizing member in the form of a wire of substantially V-shaped having eyes 11, 12 at the forward and rearward ends thereof. An eye 13 is secured by wire and welded to the lower portion of the stabilizer 10 and this is connected by a link 14 to a depending hook unit 15. An elongated shaft 16 extends through the bore of the body 5 and the bearing sleeves 6, 7 and has eyes 17 and 18 at the forward and rearward ends thereof. A fishing line is connected to the eyes 17, while the eye 18 is connected by a link 19 to a rear hook unit 20.

A forwardly balancing weight supplement 21 is added to the forward leg portion of the stabilizer frame 10 so as to give a downward effort to the forward portion of the lure.

Obviously, as the lure is pulled through the water, it will be rotated by the action of the water against the spiral fin 8.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A fish lure of the character described comprising a rotary body portion, a shaft extending entirely through said body, antifriction bearings positioned in the body for said shaft, eyes formed in the extremities of the shaft, a spiral fin secured to the body and extending longitudinally of said body, a depending frame pivotally supported upon the projecting ends of the shaft, a weight positioned on the frame and at its leading portion, a hook supporting eye secured to the frame rearwardly of the weight, a multiple hook carried thereby, and a multiple hook carried by the rear eye of the shaft.

WARREN H. FLOOD.